US012020276B1

(12) United States Patent
Inan et al.

(10) Patent No.: US 12,020,276 B1
(45) Date of Patent: Jun. 25, 2024

(54) SYSTEMS AND METHODS FOR BENEFIT AFFINITY USING TRAINED AFFINITY MODELS

(71) Applicant: Walmart Apollo, LLC, Bentonville, AR (US)

(72) Inventors: Aysenur Inan, Mountain View, CA (US); Keerthi Gopalakrishnan, San Jose, CA (US); Rahul Radhakrishnan Iyer, Sunnyvale, CA (US); Sneha Gupta, San Jose, CA (US); Divya Chaganti, San Jose, CA (US); Yokila Arora, San Jose, CA (US); Kamilia Ahmadi, San Jose, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/104,123

(22) Filed: Jan. 31, 2023

(51) Int. Cl.
*G06Q 30/02* (2023.01)
*G06Q 30/0204* (2023.01)
*G06Q 30/0207* (2023.01)

(52) U.S. Cl.
CPC ..... *G06Q 30/0224* (2013.01); *G06Q 30/0205* (2013.01); *G06Q 30/0236* (2013.01)

(58) Field of Classification Search
CPC ............... G06Q 30/02; G06Q 30/0224; G06Q 30/0205; G06Q 30/0236; G06Q 30/0254;
(Continued)

(56) References Cited

U.S. PATENT DOCUMENTS 10,157,411 B1  12/2018  Vasishta
11,227,322 B1   1/2022  Vijayan et al.
(Continued)

FOREIGN PATENT DOCUMENTS

CN  111602152 A  *  8/2020  ............. G06Q 50/00
CN  113177613 A  *  7/2021  ............... G06K 9/62
(Continued)

OTHER PUBLICATIONS

Hong, Taekeun; Choi, Jin_a; Lim,Kiho; Kim, Pankoo, Enhancing Personalized Ads Using Internet Category Classification of SNS Users Based on Deep Neural Networks (English), Sensors (Basel, Swirzerland), 21(1), 199, Dec. 30, 2020 (Year: 2020).*
(Continued)

*Primary Examiner* — Marilyn G Macasiano
(74) *Attorney, Agent, or Firm* — Morgan, Lewis & Bockius LLP; Manita Rawat

(57) ABSTRACT

Systems and methods utilizing a classification model and a ranking model are disclosed. A user identifier is received and a user profile is generated. The user profile includes a plurality of user features. The user profile is classified into a classification using a trained classification model. The trained classification model receives a first subset of the plurality of user features. A set of communication elements is ranked using a trained ranking model. The trained ranking model receives a second subset of the plurality of user features. An electronic communication including a plurality of interface elements is generated. The plurality of interface elements includes at least one communication element selected from the ranked set of communication elements in descending ranked order. A type of the electronic communication is selected based on the classification of the user profile.

20 Claims, 13 Drawing Sheets

(58) Field of Classification Search
CPC ............ G06Q 10/067; G06Q 30/0246; G06Q 30/0207
See application file for complete search history.

(56) References Cited

U.S. PATENT DOCUMENTS

| | | | | |
|---|---|---|---|---|
| 11,423,413 B2* | 8/2022 | Pandey | ............ | G06Q 10/06311 |
| 11,455,663 B2 | 9/2022 | Kaul et al. | | |
| 11,540,019 B2* | 12/2022 | Su | .................... | H04N 21/26603 |
| 2008/0250026 A1* | 10/2008 | Linden | .................. | G06F 16/904 |
| 2011/0055000 A1* | 3/2011 | Zhang | ................ | G06Q 30/0244 |
| | | | | 705/14.43 |
| 2011/0258049 A1* | 10/2011 | Ramer | ................ | G06Q 30/0273 |
| | | | | 705/14.69 |
| 2012/0078693 A1 | 3/2012 | Mendiratta et al. | | |
| 2015/0193540 A1* | 7/2015 | Wexler | ................ | G06F 16/9535 |
| | | | | 707/734 |
| 2017/0278010 A1* | 9/2017 | Edakunni | ............... | H04L 41/147 |
| 2020/0220835 A1* | 7/2020 | Kwatra | ................ | H04L 51/234 |
| 2020/0228452 A1* | 7/2020 | Boss | ........................ | H04L 47/24 |

FOREIGN PATENT DOCUMENTS

| | | | | | |
|---|---|---|---|---|---|
| CN | 114266592 A | | 4/2022 | | |
| IN | 3129/CHE/2009 A | * | 6/2011 | ............ | G06F 15/163 |
| JP | 6408346 A | * | 10/2018 | ............ | G06Q 30/02 |
| KR | 2010-0118061 A | * | 11/2010 | ............ | G06Q 30/00 |
| WO | WO 2017/074808 A1 | * | 5/2017 | ............ | G06F 17/30 |

OTHER PUBLICATIONS

Panagiotis Galopoulos; Shryssanthi Lakovidou; Vasiliki Gkatziaki; Symeon Papadopolous; Yiannis Kompatsiaris, Towards a Privacy Respecting Image-based User Profiling Component (Englsih), 2021 International Conference on Content-Based Multimedia Indexing (CBMI) (pp. 1-6), Jun. 28, 2021 (Year: 2021).*

Rachsuda Jiamthapthaksin; Than Htike Aung, User Preferences profiling based on user behaviors on Facebook page categories ( English), 2017 9th international Conference on Knowledge and Smart Technology (KST) (pp. 248-253), Feb. 1, 2017 (Year: 2017).*

Xuan Bao; Jun Yang; Lu Luo; Yifel Jiang; Emmanuel Munguia Tapia; Evan Welbourne, CommSense: Identity Social Relationship with Phone Contracts via Mining Communications (English), 2015 16th IEEE International Conference on Mobile Data Management (vol. 1, pp. 227-234), Jun. 1, 2015 (Year: 2015).*

WePo Lee; Jian-Hsin Wang, A user-centered remote control system for personalized multimedia channel selection(English), IEEE Transactions on Consumer Electronics (vol. 50, Issue: 4, Page9s): 1009-1015), Nov. 1, 2004 (Year: 2004).*

M. Strobbe; O. Van Laere; S. Dauwe; F. De Turck; B. Dhoedt; P. Demeester, Efficient Management of User Interests for Personalized Communication Services (English), NOMS Workshops 2008-IEEE Network operations and Management Symposium workshops (pp. 257-264), Jun. 16, 2008 (Year: 2008).*

* cited by examiner

SYSTEMS AND METHODS FOR BENEFIT AFFINITY USING TRAINED AFFINITY MODELS

TECHNICAL FIELD

This application relates generally to training and deployment of machine learning models, and more particularly, to training and deployment of affinity prediction models.

BACKGROUND

Current network interfaces, such as e-commerce interfaces, can provide different benefits or interactions based on a user's enrollment in certain programs. For example, enrollment in a loyalty or other membership program can allow a user to access portions of a user interface inaccessible to non-members, perform modified actions not available to non-members, and/or provide additional benefits supplemental to interactions performed through a user interface.

Current systems provide generic notifications regarding the existence and availability of such benefits. For example, current interfaces provide a generic interface element, such as a banner, indicating the existence of a loyalty or membership program. However, current systems are not capable of providing tailored or targeted interface elements that include information relevant to a specific user or segment of users with respect to existing enrollment programs.

SUMMARY

In various embodiments, a system is disclosed. The system includes a non-transitory memory and a processor communicatively coupled to the non-transitory memory. The processor is configured to read a set of instructions to receive a user identifier and generate a user profile for the user identifier. The user profile includes a plurality of user features. An affinity module is configured to classify the user profile into one of a plurality of classifications using a trained classification model and rank a set of communication elements using a trained ranking model. The trained classification model is configured to receive a first subset of the plurality of user features. The trained ranking model is configured to receive a second subset of the plurality of user features. The processor is further configured to read a set of instructions to generate an electronic communication including a plurality of interface elements. The plurality of interface elements includes at least one communication element selected from the ranked set of communication elements in descending ranked order. A type of the electronic communication is selected based on the classification of the user profile.

In various embodiments, a computer-implemented method is disclosed. The computer-implemented method includes steps of receiving, by a processor, a user identifier and generating, by the processor, a user profile for the user identifier. The user profile includes a plurality of user features. The computer-implemented method further includes classifying, by a trained classification model, the user profile into one of a plurality of classifications and ranking, by a trained ranking model, a set of communication elements. The trained classification model is configured to receive a first subset of the plurality of user features and the trained ranking model is configured to receive a second subset of the plurality of user features. The computer-implemented method further includes generating, by the processor, an electronic communication including a plurality of interface elements. The plurality of interface elements includes at least one communication element selected from the ranked set of communication elements in descending ranked order. A type of the electronic communication is selected based on the classification of the user profile.

In various embodiments, a non-transitory computer-readable medium having instructions stored thereon is disclosed. The instructions, when executed by at least one processor, cause a device to perform operations comprising of receiving, by a processor, a user identifier and generating, by the processor, a user profile for the user identifier. The user profile includes a plurality of user features. The device is further configured to perform operations comprising classifying, by a trained classification model, the user profile into one of a plurality of classifications and ranking, by a trained ranking model, a set of communication elements. The trained classification model is configured to receive a first subset of the plurality of user features and the trained ranking model is configured to receive a second subset of the plurality of user features. The device is further configured to perform operations comprising generating, by the processor, an electronic communication including a plurality of interface elements. The plurality of interface elements includes at least one communication element selected from the ranked set of communication elements in descending ranked order. A type of the electronic communication is selected based on the classification of the user profile.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
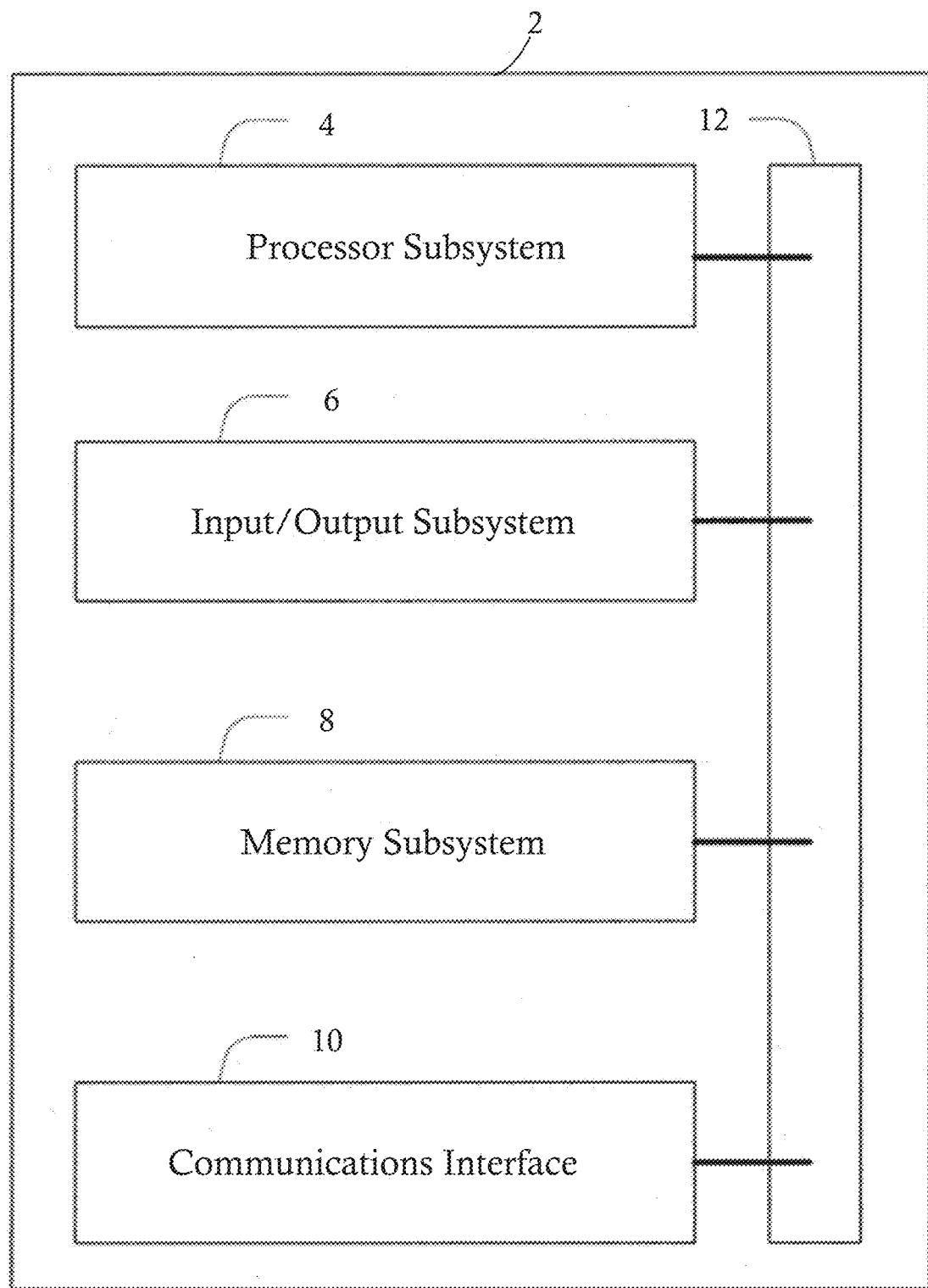
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating an electronic communication campaign including one or more recommended communication elements. In various embodiments, a system for generating an electronic communication campaign based on a set of highest-ranked communication elements is configured to receive a user identifier associated with a user (i.e., associated with a user interacting with a network interface through a user system). A user profile is generated for the user identifier. The user profile can include data representative of historical and/or current user interactions. The user profile is classified, e.g., segmented, into one of a plurality of predetermined classifications and a ranking model is applied to rank a plurality of potential communication elements based, at least in part, on the classification. The ranking model is configured to identify an affinity, or probability, score for one or more communication elements. An electronic communication channel is selected based, at least in part, on the classification of the user profile and an electronic communication including one or more highest-ranked communication elements is transmitted via the electronic communication channel.

In some embodiments, systems and methods for generating an electronic communication campaign including one or more recommended communication elements includes generation and/or deployment of one or more trained classification models configured to classify a user profile associated with a user identifier into one of a plurality of predetermined classifications. In some embodiments, systems and methods for generating an electronic communication campaign including recommended communication elements includes generation and/or deployment of one or more trained ranking models configured to rank a plurality of communication elements for inclusion in a communication campaign. In some embodiments, a trained classification model and a trained ranking model can be referred to collectively as a trained affinity model.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, neural networks which are trained (e.g., configured or adapted) to classify a user identifier and select a communication element is disclosed. A neural network trained to classify a user identifier and select a communication element may be referred to as a trained affinity model. The trained affinity model can be configured to receive a user identifier, classify the user identifier based on a user profile associated with the user identifier, rank affinity probabilities for each of a plurality of communication elements, select one or more interface elements based on the ranked affinity probabilities, and select a communication type based, at least in part, on the classification of the user profile. Although embodiments are discussed herein including a model configured to performed each of these functions, it will be appreciated that multiple individual models, each configured to perform a portion of the disclosed methods, can be implemented.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating a communication campaign including one or more ranked communication elements selected by a trained affinity model and/or training of an affinity model, as described herein. The instruction set can be stored in any acceptable form of machine-readable instructions, including source code or various appropriate programming languages. Some examples of programming languages that can be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processor subsystem 4.

Figure 2:
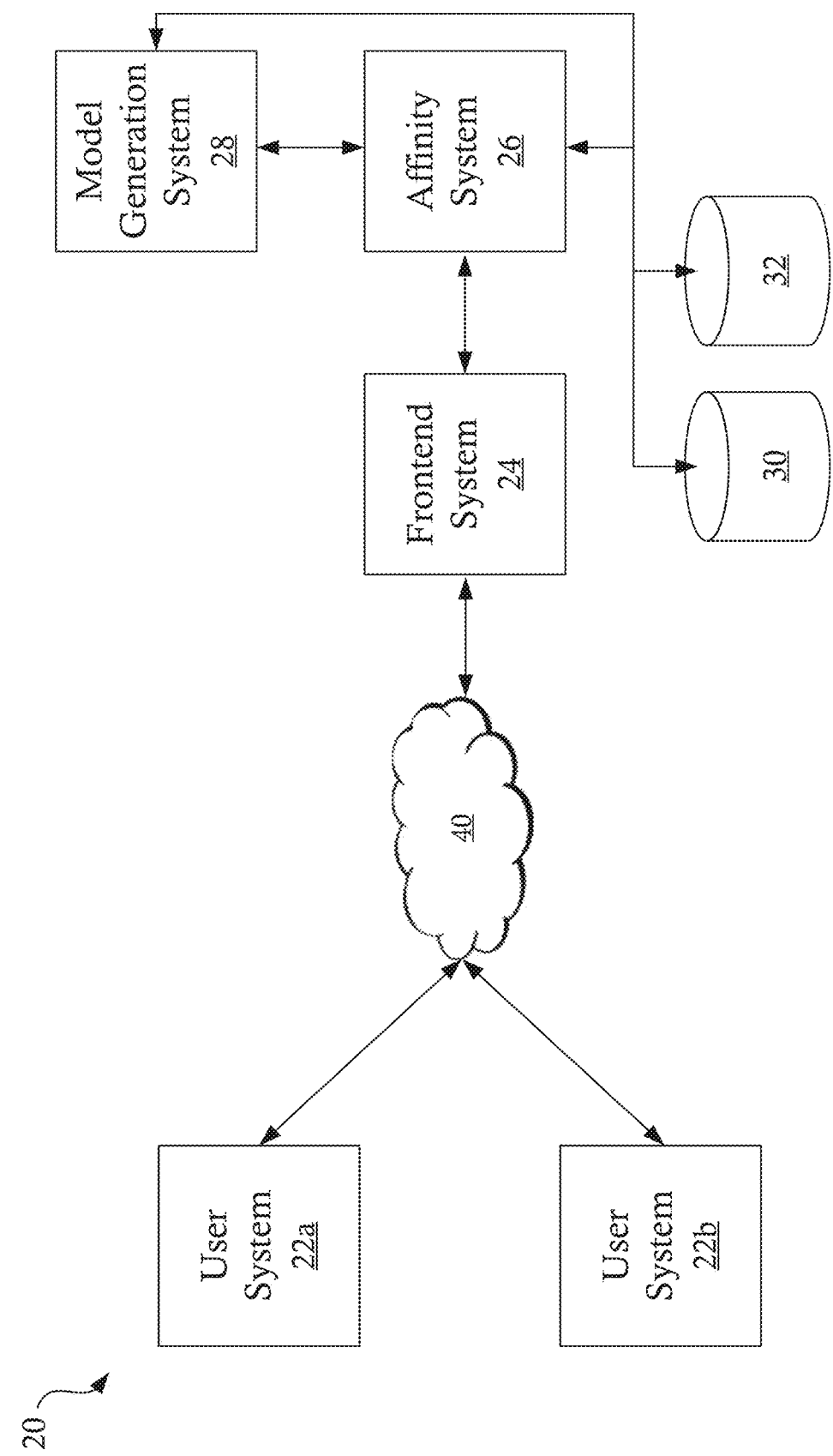
FIG. 2 illustrates a network environment configured to provide a network interface including one or more elements selected by an affinity model, in accordance with some embodiments.

FIG. 2 illustrates a network environment 20 configured to generate electronic communications including one or more ranked communication elements, in accordance with some embodiments. The network environment 20 includes a plurality of systems configured to communicate over one or more network channels, illustrated as network cloud 40. For example, in various embodiments, the network environment 20 can include, but is not limited to, one or more user systems 22a, 22b, a frontend system 24, an affinity system 26, a model generation system 28, a model store database 30, and a historical data database 32. Although embodiment are illustrated herein including discrete systems, it will be appreciated that any of the illustrated and/or discussed systems can be combined. For example, in some embodiments, the frontend system 24, the affinity system 26, and/or the model generation system 28 can be combined into one or more systems. In addition, it will be appreciated that although a single instance of certain systems is illustrated, each of the disclosed systems and/or processes can be distributed over multiple systems and/or multiple instances of similar systems.

In some embodiments, the user systems 22a, 22b are in data communication with the frontend system 24, which is configured to provide electronic communications to the user systems 22a, 22b. The electronic communications can take any suitable form, such as, for example, a customized network interface, an e-mail, a push notification, and/or any other suitable electronic communication. For example, in some embodiments, the frontend system 24 includes an interface generation engine configured to generate a customized network interface and provide the customized network interface, and/or instructions for generating the customized network interface, to a user system 22a, 22b. The customized network interface can include any suitable network interface, such as, for example, an e-commerce interface, a service interface, an intranet interface, and/or any other suitable user interface. In some embodiments, the customized interface includes a webpage, web portal, intranet page, and/or other interactive interface. The customized network interface includes at least one communication interface element selected by an affinity model. In some embodiments, the communication interface element includes an interface element related to an enrollment program including a customized benefit presentation selected by the affinity model.

As another example, in some embodiments, the frontend system 24 includes an electronic communication engine configured to generate one or more electronic communications such as an e-mail or push notification. The electronic communication engine is configured to generate an electronic communication including at least one communication interface element selected by an affinity model. In some embodiments, the communication interface element includes an interface element related to an enrollment program including a customized benefit presentation selected by the benefit affinity model.

In some embodiments, the frontend system 24 is in data communication with an affinity system 26 configured to identify highest-ranked communication elements for inclusion within an electronic communication. For example, in some embodiments, an affinity engine is configured to implement one or more trained models configured to receive a user identifier and select a set of top ranked communication elements for inclusion in an electronic communication. In some embodiments, the affinity system 26 is configured to generate a user profile associated with the received user identifier. The user profile can include data representative of one or more features.

In some embodiments, the affinity engine can implement any suitable trained machine learning model(s) configured to receive a user identifier, the user profile associated with the user identifier, and/or one or more features associated with the user profile and generate a set of ranked communication elements. In some embodiments, the trained affinity engine implements a classification model and a ranking model. As discussed in greater detail below, the classification model is configured to classify the user profile into one of a plurality of predetermined classifications and the ranking model is configured to generate rankings (or affinities) for a set of communication elements. In some embodiments, the classification model includes a recency, frequency, and monitored value (RFM) model.

In some embodiments, the affinity engine is configured to obtain one or more trained models from a model store database 30. The trained models, such as a trained classification model and/or a trained ranking model, include various parameters and/or layers configured to receive one or more user feature inputs and generate a classification and/or ranking, respectively. In some embodiments, each of the trained ranking models is selected based on the classification of the user profile. For example, affinity for a first user profile classified in a first category can be generated by a first ranking model and affinity for a second user profile classified in a second category can be generated by a second ranking model.

In some embodiments, the trained models can be generated by a model generation system 28. The model generation system 28 is configured to generate one or more trained models using, for example, iterative training processes. For example, in some embodiments, a model training engine is configured to receive historical data and utilize the historical data to generate a trained ranking model. The historical data can be stored, for example, in a historical data database 32. In some embodiments, the model training engine is configured to generate classification models and/or ranking models. In some embodiments, the training process utilizes labeled data such as training data including user profiles and/or features associated with user profiles associated with particular benefits and/or interface interactions. in some embodiments, the training process utilizes unlabeled data.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
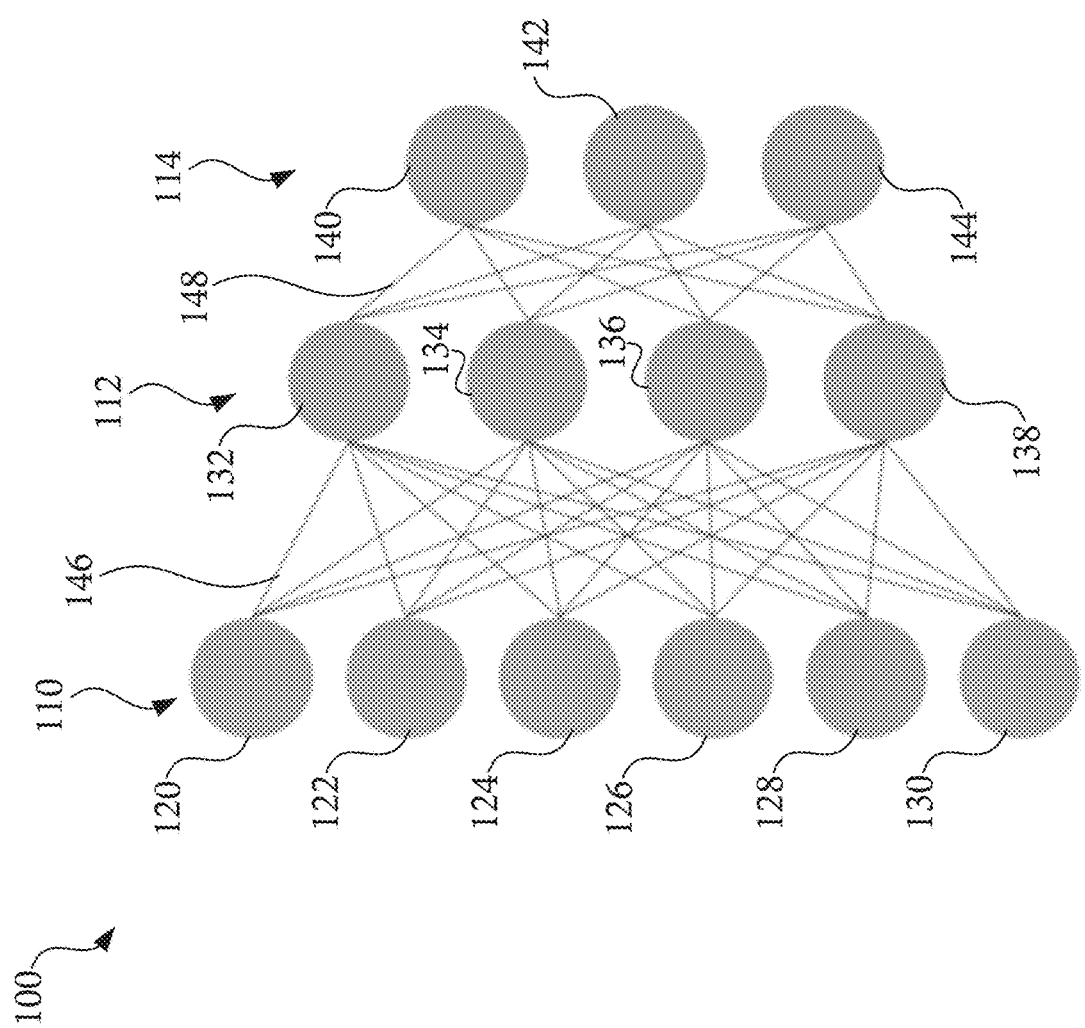
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 140-142, wherein each edge 140-142 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 140-142 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 140-142 between the nodes 120-144. In particular, edges 140-142 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 140-142 can comprise a weight being a real number, in particular, the weight is a real number within the interval $[-1, 1]$ or within the interval $[0, 1]$. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'_{i,j}{}^{(n)} = w_{i,j}{}^{(n)} - \gamma \cdot \delta_j{}^{(n)} \cdot x_i{}^{(n)}$$

wherein $\gamma$ is a learning rate, and the numbers $\delta_j^{(n)}$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta_j^{(n+1)}$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 114, wherein f' is the first derivative of the activation function, and $y_j^{(n+1)}$ is the comparison training value for the j-th node of the output layer 114.

In some embodiments, the neural network 100 is configured, or trained, to categorize a received and/or generated user profile into one of a plurality of predetermined categories based on one or more feature inputs related to the user profile. The neural network 100 can be configured to output a probability a user profile being within one of the predetermined categories and/or can output the category having the highest probability.

In some embodiments, the neural network 100 is configured, or trained, to rank potential communications associated with an enrollment program. The neural network 100 can be configured to receive, for example, one or more user features and output a ranked list of a plurality of potential communication elements. In some embodiments, the neural network 100 can be configured to select interface elements based on the ranking of the plurality of potential communication elements and/or can be configured to output the ranking of the potential communication elements to a second system configured to select interface elements based on the ranking.

Figure 4:
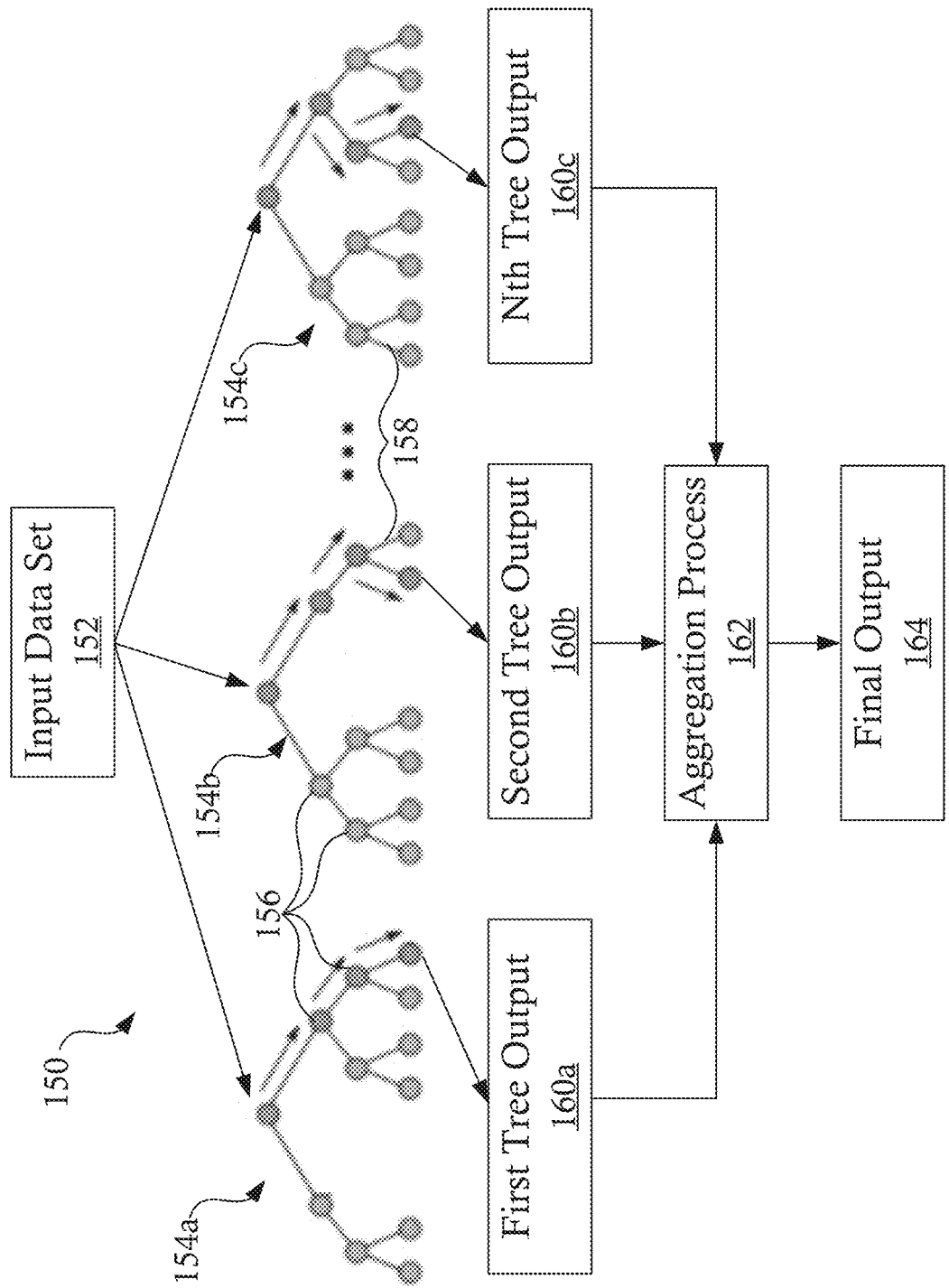
FIG. 4 illustrates a tree-based neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

In some embodiments, the tree-based neural network 150 is configured, or trained, to categorize a received and/or generated user profile into one of a plurality of predetermined categories based on one or more feature inputs related to the user profile. The tree-based neural network 150 can be configured to output a probability a user profile being within one of the predetermined categories and/or can output the category having the highest probability.

In some embodiments, the tree-based neural network 150 is configured, or trained, to rank potential communication elements associated with an enrollment program. The tree-based neural network 150 can be configured to receive, for example, one or more user features and output a ranked list of a plurality of potential communication elements. In some embodiments, the tree-based neural network 150 can be configured to select interface elements based on the ranking of the plurality of potential communication elements and/or can be configured to output the ranking of the potential communication elements to a second system configured to select interface elements based on the ranking.

Figure 5:
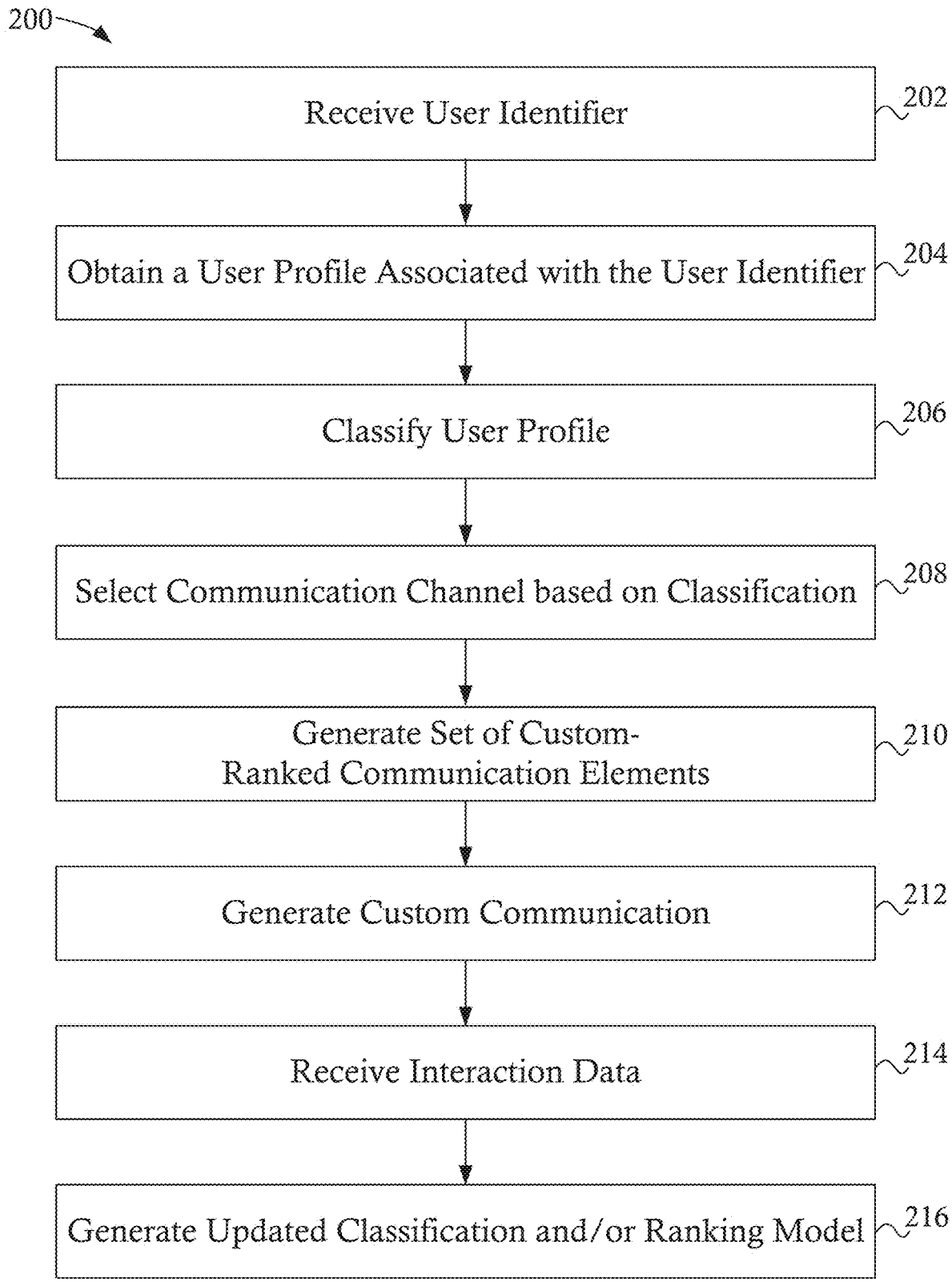
FIG. 5 is a flowchart illustrating a method of generating an electronic communication including one or more ranked communication elements, in accordance with some embodiments.
Figure 6:
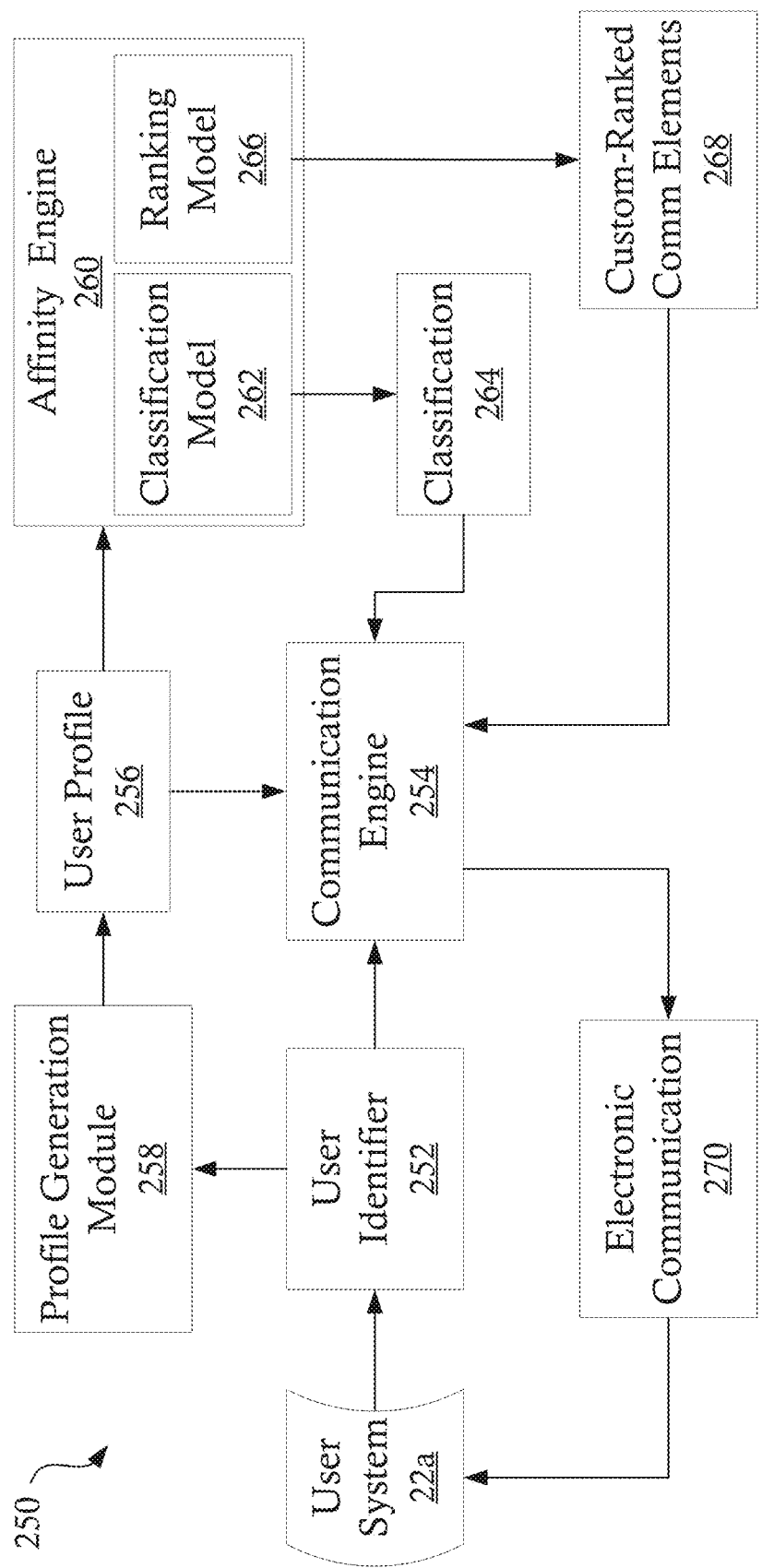
FIG. 6 is a process flow illustrating various steps of the method of generating an electronic communication including one or more ranked communication elements, in accordance with some embodiments.

FIG. 5 is a flowchart illustrating a method 200 of generating an electronic communication including one or more ranked communication elements, in accordance with some embodiments. FIG. 6 is a process flow 250 illustrating various steps of the method 200 of generating an electronic communication including one or more ranked communication elements, in accordance with some embodiments. At step 202, a user identifier 252 is received by a communication engine 254. The user identifier 252 can include a unique data representation associated with a user. In some embodiments, the user identifier 252 is received from a user system 22a, 22b as part of a request for an electronic communication, such as a request for a network interface page.

At step 204, the communication engine 254 obtains a user profile 256 associated with the user identifier 252. For example, in some embodiments, the communication engine 254 is in data communication with a profile generation engine 258. The profile generation engine 258 is configured to generate a user profile 256, for example, by aggregating various data elements stored in one or more databases and/or obtaining a stored user profile from one or more database. A user profile 256 includes a plurality of features associated with the user identifier 252. The plurality of features can include, but are not limited to, transactional features, demographic features, communication feature, intent features, program state features, and model-specific features.

In some embodiments, a set of transaction features can include, but is not limited to, transaction sources (e.g., web orders, in-store orders, etc.), look-back periods (e.g., 30 days, 60 days, 90 days), transactions associated with a predetermined period (such as a trial period for an enrollment program), transactions including predetermined items and/or predetermined categories, total expenses associated with a transaction, average expenses for all transactions, a transaction interval, a transaction regularity, and/or any other transactional features. Transactional data can include both historical data, e.g., data representative of prior transactional interactions with one or more systems associated with, for example, a particular retailer or service provider, and real-time data, e.g., data representative of a current interaction with one or more systems associated with, for example, the particular retailer or service provider.

In some embodiments, a set of demographic features can include, but is not limited to, age, gender, occupation, income, vehicle ownership, education level, and/or other information related to an individual associated with the user identifier. Demographic features can be obtained from the user, for example during interactions with a user interface, and/or can be obtained from a third party data provider. In some embodiments, demographic information is partially anonymized prior to being associated with a user profile. For example, in some embodiments, demographic features can be converted into bands or buckets that associate a user identifier with a particular segment of a population, e.g., individuals 18-35, individuals within a particular zip code, without providing exact identifying information for a particular user (e.g., without providing an exact age).

In some embodiments, a set of communication features can include, but is not limited to, historical interaction data associated with one or more benefits of an enrollment program. For example, a set of communication features can include data associated with historical transaction fulfillment, indicating a number of transactions that were completed via pickup, local delivery, and/or carrier shipping. Similarly, a set of communication features can include data associated with a value, such as a monetary and/or time value, associated with historical transaction fulfillment, indicating a total value amount (e.g., a total monetary value, a total time value) associated with particular fulfillment methods.

In some embodiments, a set of intent features can include, but is not limited to, fulfillment intent type (e.g., items for pickup, local delivery, shipping, etc.), a consideration intent type (e.g., intents related to categories of items such as grocery, general merchandise, etc.), interaction intents (e.g., historical data associated with interaction behaviors), a fulfillment cancellation ratio (e.g., ratio of placed to cancelled orders for a given fulfillment method), and/or any other suitable intent features. Intent features can be generated by one or more intent modules configured to infer and/or generate intent types based on historical and/or real-time interaction data associated with a user identifier.

In some embodiments, a set of program state features include features representative of a current state of the user identifier with respect to an enrollment program. For example, in some embodiments, a program state feature can indicate that the user identifier is associated with a user account that has not previously enrolled in an enrollment program, a user account that has previously enrolled but is not currently enrolled in an enrollment program, or a user account that is currently enrolled in an enrollment program.

In some embodiments, a set of model specific features include RFM model features such as recency values, frequency values, monitored values (e.g., tracked monetary values), customer segment classifications, and/or any other suitable model specific features. A user identifier can be segmented into multiple customer segment classifications based on historical interaction data and/or user preference selections.

In some embodiments, a user profile 256 is generated by obtaining each set of features from one or more feature stores and/or systems. For example, in some embodiments, a set of historical features can be obtained from a historical data database 32. Although a single database is illustrated, it will be appreciated that the historical data database 32 can include multiple databases and/or distributed storage mechanisms configured to store historical feature data in a non-transitory storage medium. As another example, in some embodiments, a set of real-time features can be obtained from one or more systems, such as a user system 22a, 22b associated with the user identifier.

In some embodiments, generating a user profile 256 includes generating linkages, or connections, between various data elements within a database. For example, in some embodiments, the profile generation engine 258 (and/or any other suitable engine or system) is configured to associate interaction data generated during a first interaction with interaction data generated during a second interaction. The first interaction can include, for example, data representative of an interaction between a user associated with a user identifier and an in-store system, such as a point-of-sale (POS) system. The first interaction can represent, for example, an in-store purchase. The second interaction can include, for example, data representative of an interaction between a user associated with the user identifier and an online system, such as an e-commerce network interface system. The second interaction can represent, for example, an online purchase.

The profile generation engine 258 can be configured to map first interactions onto a user profile that includes second interactions. Mapping can be performed based on one or more unique data identifiers, such as, for example, user-unique numbers associated with transactions such as partial credit card numbers (e.g., last four digits), phone numbers, etc. The use of user-unique numbers provides a high-confidence level in mapping of first interactions to a user-profile including second interactions.

In some embodiments, the profile generation engine 258 is configured to generate a user profile 256 containing a reduced set of user features. The reduced set of user features can be generated by, for example, filtering the set of user features associated with the user identifier 252, combining user features, tokenizing user features, vectorizing user features, and/or any other suitable feature generation and/or combination process. For example, in some embodiments, a user profile 256 includes location features, frequency features, user preference features, and current interaction features.

In some embodiments, location features include features representative of the location of interactions associated with the user identifier. For example, a first category of interactions, such as "grocery" interactions, can be associated with interactions between a user and an in-store POS system. As another example, a second category of interactions, such as "general merchandise" interactions, can be associated with interactions between a user and an online interface.

In some embodiments, frequency features include features representative of the frequency of types of interactions associated with the user identifier. For example, a first category of interactions between a user and an in-store POS system can have a frequency feature indicating interactions at a first interval, e.g., weekly, and a second category of interactions between a user and an online interface can have a frequency feature indicating interactions at a second interval, e.g., monthly. The frequency features can also include features representative of a change in frequency, e.g., an indication that the frequency of one or more categories of interactions has increased and/or decreased over a certain time period.

In some embodiments, user preference features include features representative of personal preferences of a user associated with a user identifier. For example, a user can have one or more "favorite" items that the user typically purchases during certain interactions. User preferences can be obtained by analyzing past interaction data and/or can be provided by a user during an interaction.

In some embodiments, current interaction features include features representative of a concurrent, real-time interaction (e.g., concurrent interaction data) between a user associated with the user identifier and a communications engine 254, for example, interactions between a user and a network interface page. The current interaction features can include, for example, features representative of searches performed via a network interface, context-specific interactions such as item view, add-to-cart, etc., and/or any other suitable real-time interactions.

At step 206, the user profile 256 is classified into one of a plurality of predetermined classifications. For example, an affinity engine 260 can be configured to implement a trained classification model 262. The affinity engine 260 receives the user profile 256 (or a portion thereof) and provides the user profile 256 (or a portion thereof) as an input to the trained classification model 262. The trained classification model 262 is configured to classify the user profile 256 into one of a plurality of predetermined classifications based on one or more features included in the user profile 256. In some embodiments, the trained classification model 262 can be configured to output a classification 264 representative of the classification of the user profile 256. In some embodiments, the user profile 256 is modified to include the classification 264 and/or the classification 264 can be stored in a database.

In some embodiments, the trained classification model 262 includes an RFM model. RFM models are configured to receive a set of inputs representative of prior interactions for user and classify the user into one of a set of outputs. An RFM model is configured to calculate a recency score (e.g., a score representative of time that has elapsed since prior interactions), frequency score (e.g., a score representative of time that elapses between interactions), and monitored value (e.g., value of interactions such as monetary value, time value, etc.). In some embodiments, an RFM model is configured to calculate a recency score and a frequency score having a value between 1 and 5. Although specific embodiments are discussed herein, it will be appreciated that an RFM model can be configured to calculate scores within any predetermined range.

In some embodiments, an RFM model is configured to classify a user profile into one of a plurality of classifications based on the recency score and the frequency score. For example, in some embodiments, a first user profile having a determined recency score within a range of 1-2 and a frequency score within a range of 1-2 can be classified into a first classification and a second profile having a determined recency score within a range of 1-2 and a frequency score within a range of 3-4 can be classified into a second classification. It will be appreciated that the RFM model can be configured to classify a user profile into one of any number of classifications having any suitable delineations between the classifications, and specific values given herein are provided for example purposes only.

Figure 7:
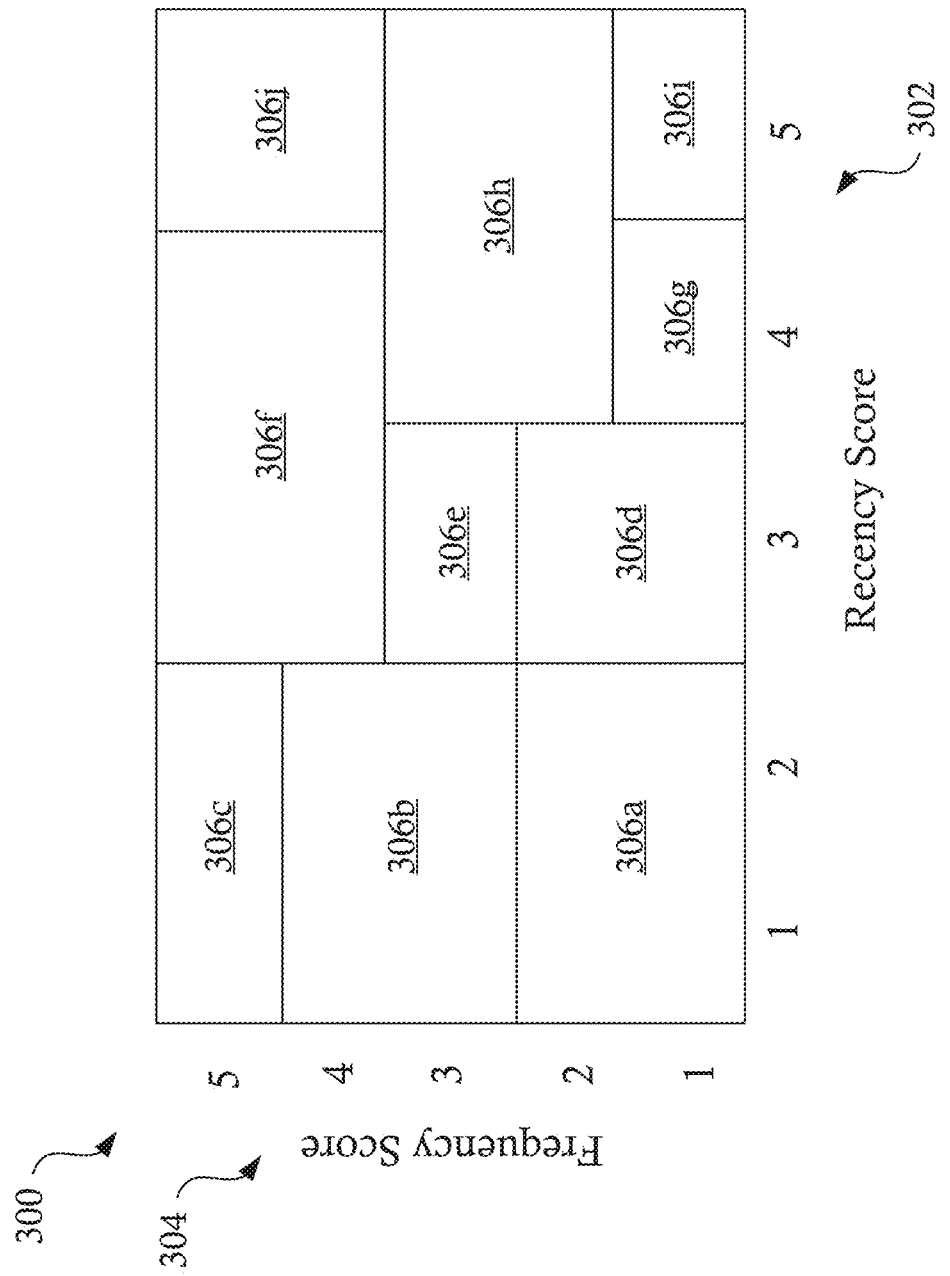
FIG. 7 illustrates output of a trained RFM classification model, in accordance with some embodiments.

FIG. 7 illustrates an output 300 of a trained RFM classification model, in accordance with some embodiments. As shown in FIG. 7, in some embodiments, a trained RFM classification model can be configured to classify a user profile into one of ten potential classifications 306a-306j. Each of the classifications 306a-306j is associated with a particular range of values for a recency score 302 and a frequency score 304. For example, in the illustrated embodiment, a first classification 306a is associated with a recency score 302 in a range of 1-2 and a frequency score 304 in a range of 1-2, a second classification 306b is associated with a recency score in a range of 1-2 and a frequency score 304 in a range of 3-4, a third classification 306c is associated with a recency score in a range of 1-2 and a frequency score 304 in of 5, a fourth classification 306d is associated with a recency score of 3 and a frequency score 304 in a range of 1-2, a fifth classification 306e is associated with a recency score of 3 and a frequency score 304 of 3, a sixth classification 306f is associated with a recency score in a range of 3-4 and a frequency score 304 in a range of 4-5, a seventh classification 306g is associated with a recency score of 4 and a frequency score 304 of 1, an eighth classification 306h is associated with a recency score in a range of 4-5 and a frequency score 304 in a range of 2-3, a ninth classification 306i is associated with a recency score 302 of 5 and a frequency score 304 of 1, and a tenth classification 306j is associated with a recency score 302 of 5 and a frequency score 304 in a range of 4-5. It will be appreciated that these classifications 306a-306j and associated ranges are provided as an example and are not limiting with respect to a trained RFM model. Each classification 306a-306j represents a percentage of the overall user base included in a training data set used to train an RFM model. The sum of the percentages for each of the individual classifications 306a-306j is equal to 100%.

With reference again to FIGS. 5-6, at step 208, a communication channel for delivery of communication elements is selected based, at least in part, on the classification 264 of the user profile 256 at step 206. For example, in some embodiments, if a user profile 256 is classified into a first classification 306a, a first communication channel is selected for delivery of one or more ranked communication elements and if a user profile 256 is classified into a second classification 306b, a second communication channel is selected. Each of the communication channels correspond to one or more electronic communication channels, such as, for example, a network interface element (e.g., an interface element embedded into a network interface), an e-mail, a push notification, and/or any other suitable electronic communication. In some embodiments, a communication channel identifier identifies the selected one of the communication channels.

At step 210, a set of custom-ranked communication elements 268 is generated for the user profile 256. For example, in some embodiments, a trained ranking model is configured to receive a set of potential communication elements representative of and/or including one or more communication provided by an enrollment program and generate a set of custom-ranked communication elements 268. In some embodiments, the set of custom-ranked communication elements 268 are ranked based on a user affinity score generated for each communication element in the set of potential communication elements with respect to the user profile and/or features of the user profile.

In some embodiments, a trained ranking model includes a linear model configured to apply one or more weights to features relevant to each of the potential communication elements. For example, in some embodiments, a linear model can be configured to calculate intervention scores for two or more potential communication elements. A logistical regression model can be applied to generate weights and/or parameters for a linear model. In some embodiments, an intervention score can be calculated as:

$$\frac{1}{(1+e^{-s})}$$

where:

$$s = w_1 F_1 + w_2 F_2 + \ldots + w_n F_n + B$$

where $w_x$ is a trained weight for a feature with respect to a potential communication element, $F_x$ is a numeric value of a feature, and B is an intercept value. In some embodiments, the use of a linear ranking model provides for identification of features having the most significant influence on communication element rankings and allows for easy characterization of a feature set. Although embodiments are discussed herein including a linear ranking model, it will be appreciated that any suitable ranking model can be used to rank communication elements.

In some embodiments, categorical and/or non-numerical features can be converted into discrete and/or continuous feature values. For example, in some embodiments, the ranking model 266 can include one or more hidden layers configured to map categorical features to continuous numerical values within a predetermined range. The converted numerical values are weighted, as discussed above, and included in a determination of the intervention score for a given communication element.

In some embodiments, an intervention score is representative of an affinity between a user and a given communication element, e.g., a prediction of the likelihood of a user interacting with a communication element and/or interacting with an underlying benefit identified by the communication element. In some embodiments, the ranking model 266 is configured to rank each of potential communication element from highest intervention score to lowest intervention score, i.e., from highest likelihood of interaction to lowest likelihood of interaction. The ranking model 266 is configured to output the set of custom-ranked communication elements 268 based on the ranking of the potential communication elements. For example, in some embodiments, the set of custom-ranked communication elements 268 includes the N highest ranked potential communication elements, where N is an integer between 1 and the total number of potential communication elements.

In some embodiments, the set of custom-ranked communication elements 268 correspond to communication elements that are recommended for a particular user profile given the determine intervention score for each communication element. For example, a highest ranked communication element in the set of custom-ranked communication elements 268 can represent a benefit that is likely to be the most desirable and/or most advantageous to a user. For example, in some embodiments an enrollment program can provide two benefits. Based on a user profile 256, a trained ranking model 266 can rank the second benefit higher than the first benefit, indicating that a user is more likely to utilize or interact with the second benefit. A communication element representative of the second benefit is recommended for inclusion in an electronic communication over a communication element representative of the first benefit.

The communication elements can be representative of any suitable benefits and/or benefit interactions provided by enrollment in and/or interaction with an enrollment program. For example, in various embodiments, communication elements can be representative of cost-saving features related to interactions with an e-commerce platform such as free delivery from a store, free shipping with no minimum purchase, fuel saving features, scan and go features allowing faster interactions with the platform, early access to items within a catalog of the platform, access to third-party interfaces or electronic offerings, and/or any other suitable benefits. Although specific embodiments are discussed herein including benefits related to interactions with an e-commerce platform, it will be appreciated that any suitable benefits for interaction with any suitable platform can be represented within communication elements and identified as a recommended communication element according to the disclosed systems and methods.

The communication elements can include any suitable electronic interface elements configured to identify a particular benefit and provide an interface transition to an interface page configured to allow a user to access the particular benefit, for example, by enrolling in an enrollment program. For example, in various embodiments, communication elements can include, but are not limited to, banners, advertisements, coupons, buttons, drop-downs, portions of directed communications (e.g., e-mail, push notifications) and/or any other suitable communication element.

As previously discussed, the user profile 256 can include a variety of features and/or categories of features. In some embodiments, the features selected for inclusion in a user profile are selected based on the input parameters of one or more trained models. For example, in some embodiments, at least some of the features included in, collected for, and/or generated for a user profile 256 can be selected and/or generated based on input parameters necessary for classification of the user profile 256 by the classification model 262 and/or a ranking model 266. As discussed in greater detail below, the input parameters for a trained model, such as a trained classification model 262 and/or a trained ranking model 266, can be determined during an iterative training process. After training a model, a profile generation engine 258 can be updated to generate a user profile 256 including the specific features selected during the training process for classification of user profiles.

In some embodiments, a user profile 256 can include feature inputs required for the trained ranking model 266 selected based on a classification 306a-306j generated by a trained classification model 262. For example, a user associated with a user identifier 252 may not have a significant amount of (or any) historical interaction data necessary to generate or extract certain features that are required as an input to the trained ranking model 266. Where a user profile 256 does not contain necessary features and/or a necessary quantity of a feature, the user profile 256 can be updated and/or augmented to include default, or categorical, features selected based on the classification 306a-306j generated by the trained classification model 262. The default features can be selected only for a user profile 256 having less than a minimum number of certain features and/or can be included in each user profile 256 regardless of the user-specific features included in the profile.

In some embodiments, a default profile can be created for each classification 306a-306j that can be output by the trained classification model 262. The default profile can be used for each user profile 256 classified into a particular category, can be used as a basis for generating a subsequent user profile that includes necessary feature inputs for a trained ranking model 266, and/or can be used to augment an existing user profile 256 to include missing or inadequate data that is required by the trained ranking model 266. It will be appreciated that the default profiles can be generated by the profile generation engine 258 and/or generated using any other suitable process.

Figure 8:
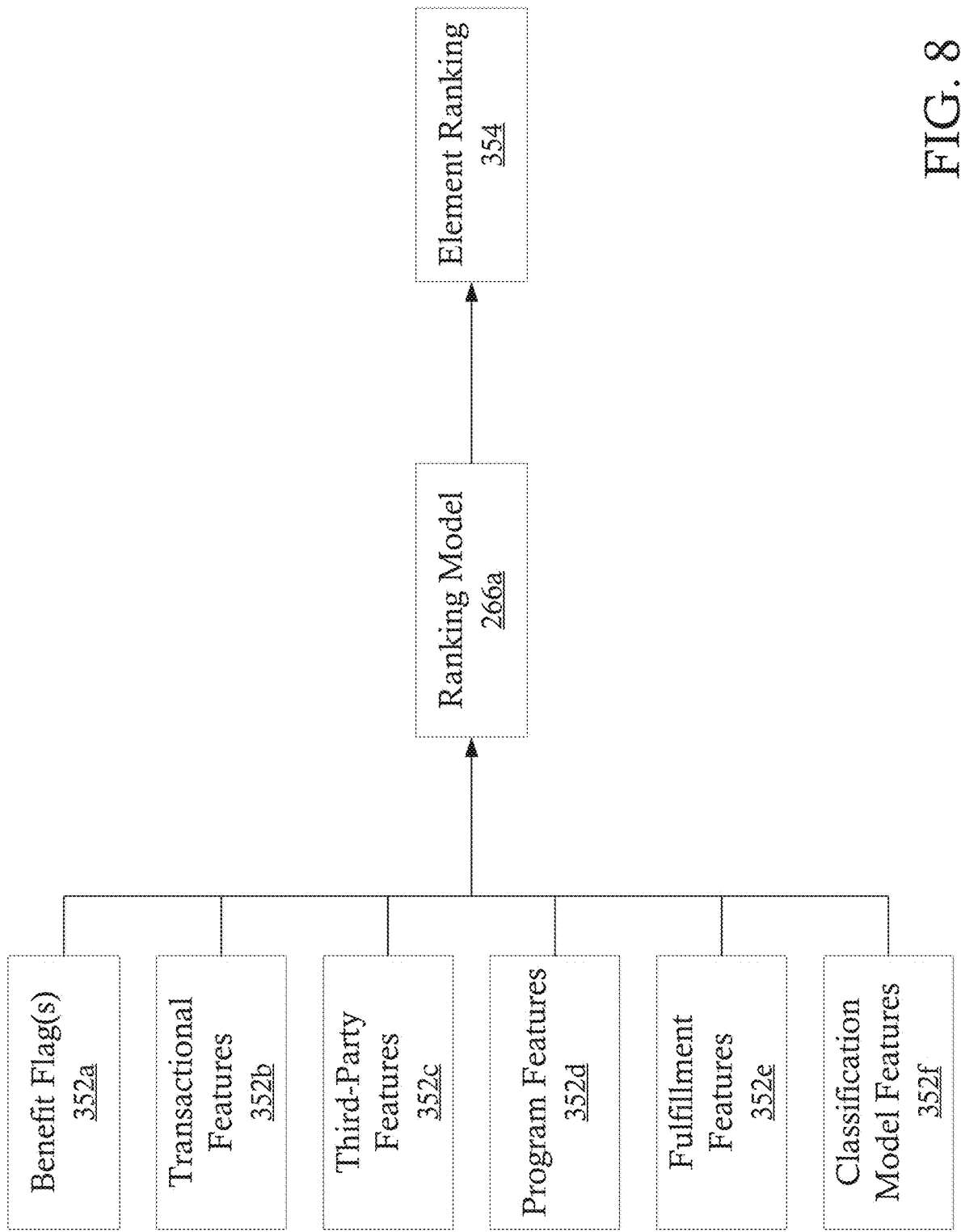
FIG. 8 illustrates an example ranking model process flow illustrating various input features being provided to a ranking model configured to estimate the likelihood of a user interacting with a communication element, in accordance with some embodiments.

FIG. 8 illustrates an example ranking model process flow 350 illustrating various input features 352a-352f being provided to a ranking model 266a configured to estimate the likelihood of a user interacting with a communication element 354. For example, in the illustrated embodiment, the set of input features includes an eligibility flag 352a identifying whether a user is eligible for receiving an electronic communication including at least one communication element, transactional features 352b, third-party features 352c, program features 352d, fulfillment features 352e, and classification model features 352f. In some embodiments, the ranking model is configured to generate a score for each user and each communication element (and/or underlying benefit represented by a communication element) according to:

$$\text{Score}_{c_i, B_j} = P(M_{c_i} | B_j) - P(M_{c_i} | \overline{B_j})$$

where $c_i$ is a user identifier, $B_j$ is a communication element identifier, P is a probability calculation, and M represents the user engaging with an enrollment program.

At step 212, the communication engine 254 generates a custom electronic communication 270 suitable for delivery via the selected communication channel including one or more of the top ranked communication elements included in the set of custom-ranked communication elements 268, such as the set of N highest ranked potential communication elements, a set of M highest ranked potential communication elements selected from the set of N highest ranked potential communication elements in descending ranked order where M is an integer between 1 and N−1, and/or any other suitable number of the ranked communication elements. For example, in some embodiments, the selected communication channel identifier indicates that a network interface, e.g., a webpage, is the selected communication channel and the communication engine 254 is configured to insert interface elements including a set of M communication elements selected in descending ranked order (i.e., starting with a highest ranked communication element and proceeding to the M-highest ranked communication element) into the webpage, for example, within predetermined locations within the generated webpage. As another example, in some embodiments, the selected communication channel identifier indicates that an electronic message, e.g., e-mail or push notification, is the selected communication channel and the communication engine 254 generates an appropriate electronic communication 270 including a set of M communication elements selected in descending ranked order (i.e., starting with a highest ranked communication element and proceeding to the M-highest ranked communication element) within the electronic communication 270. It will be appreciated that any suitable electronic communication 270 can be generated including any number of the ranked communication elements inserted in descending ranked order.

The task of identifying relevant communication elements associated with an enrollment program can be burdensome and time consuming for users, especially if users are unaware of the existence of the enrollment program, unaware of the benefits provided by the enrollment program, and/or unaware of the location within an interface suitable for engaging with an enrollment program. Typically, a user can locate information regarding an enrollment program by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page or communication of interest. Thus, the user frequently has to perform numerous navigational steps to arrive at a page containing information regarding enrollment programs and/or communication elements.

Affinity systems including trained classification models and trained ranking models, as disclosed herein, significantly reduce this problem, allowing users to locate communication elements of interest with fewer, or in some case no, active steps. For example, in some embodiments described herein, when a user is presented with one or more ranked, or recommended, communication elements, each communication element includes, or is in the form of, a link to an interface page for engaging with an enrollment program and obtaining the benefit associated with the communication element. Each recommendation thus serves as a programmatically selected navigational shortcut to an interface page, allowing a user to bypass the navigational structure of the browse tree. Beneficially, programmatically identifying communication elements of interest and presenting a user with navigations shortcuts to these items can improve the speed of the user's navigation through an electronic interface, rather than requiring the user to page through multiple other pages in order to locate the enrollment program and/or communication elements via the browse tree or via a search function. This can be particularly beneficial for computing devices with small screens, where fewer interface elements can be displayed to a user at a time and thus navigation of larger volumes of data is more difficult.

In some embodiments, the disclosed systems and methods for generating an electronic communication including one or more ranked communication elements is configured to optimize a large, diverse feature set to provide both a preferred communication channel and preferred communication content for electronic communications automatically generated by a messaging campaign. For example, in some embodiments, a user profile 256 includes features selected from a diverse feature set that can include interactions between a user and one or more network interfaces, interactions between a user and locally distributed locations (e.g., stores, warehouses, etc.), historical data regarding prior interactions over each of the potential interaction channels, etc. The disclosed systems and methods provide a non-invasive approach, e.g., not using direct customer history, for identifying a preferred communication channel (e.g., a communication channel most likely to be successful/most desirable to a user) and preferred communication content (e.g., recommended communication elements that are most likely to be of interest to a user), providing a personalized enrollment program sign-up experience for the user.

At optional step 214, intervention interaction data 272 is received. The intervention interaction data 272 is representative of an interaction outcome for a generated electronic communication 270. For example, if a user interacted with a communication element provided in an electronic communication 270, the intervention interaction data 272 can indicate which of the provided communication elements were of interest and the outcome of the interaction (e.g., enrollment in an enrollment program, enrollment in a trial period for an enrollment program, etc.). In some embodiments, if an interaction with the generated electronic communication 270 does not occur within a predetermined time period, the intervention interaction data 272 indicates a lack of interaction.

At optional step 216, an updated classification model 262a and/or an updated ranking model 266a are generated based, in part, on the intervention interaction data 272. The classification models 262a, 266a are configured through an iterative training process based, in part, on the outcomes of previously provided electronic communications 270. The updated classification model 262a and/or the updated ranking model 266a can provide more accurate recommendations as a result of incorporating the intervention interaction data 272. In some embodiments, the method 200 returns to step 206 and utilizes the updated classification model 262a and/or the updated ranking model to generate additional communications in response to receiving the user identifier 252.

Figure 9:
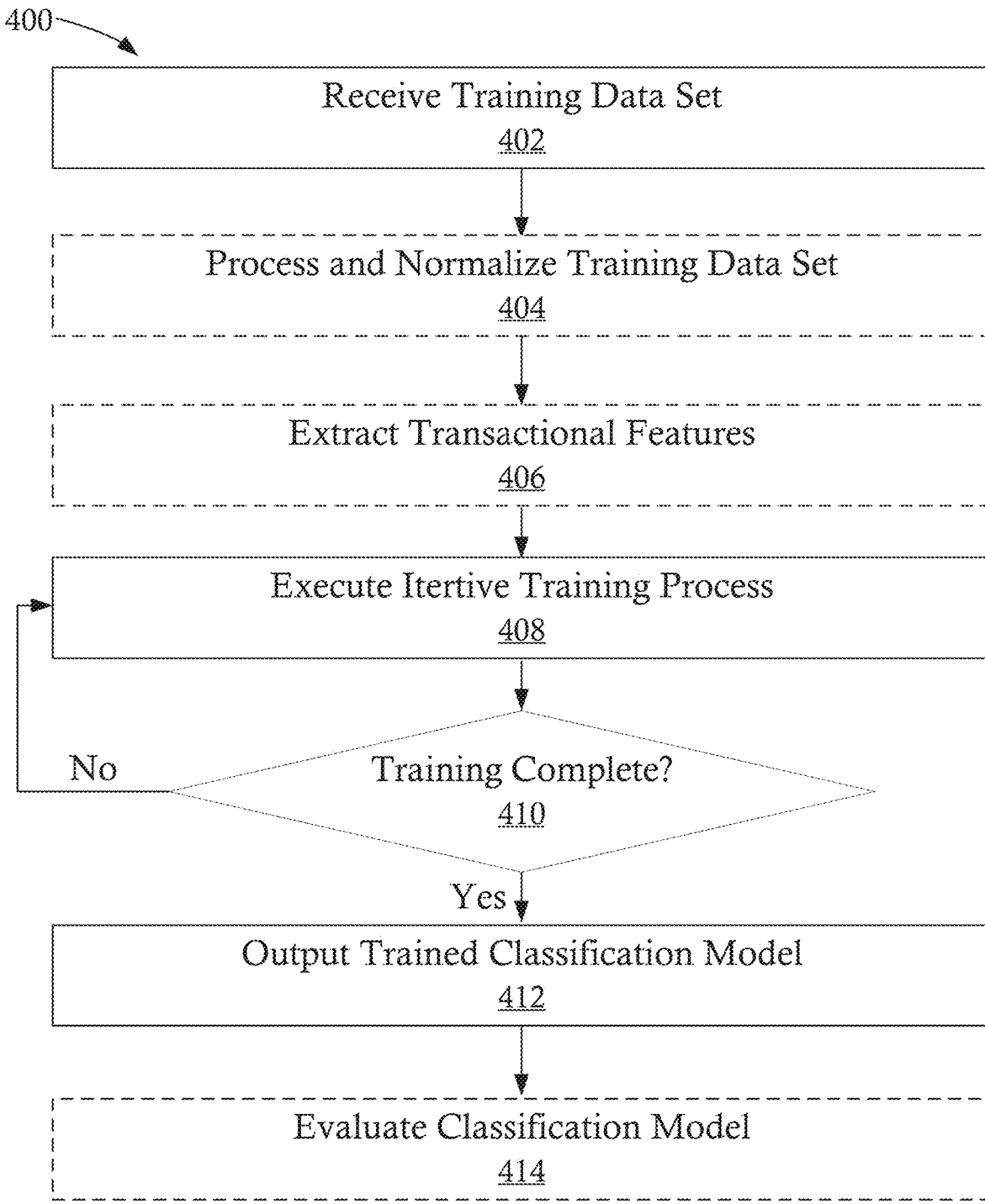
FIG. 9 is a flowchart illustrating a method of generating a trained classification model, in accordance with some embodiments.
Figure 10:
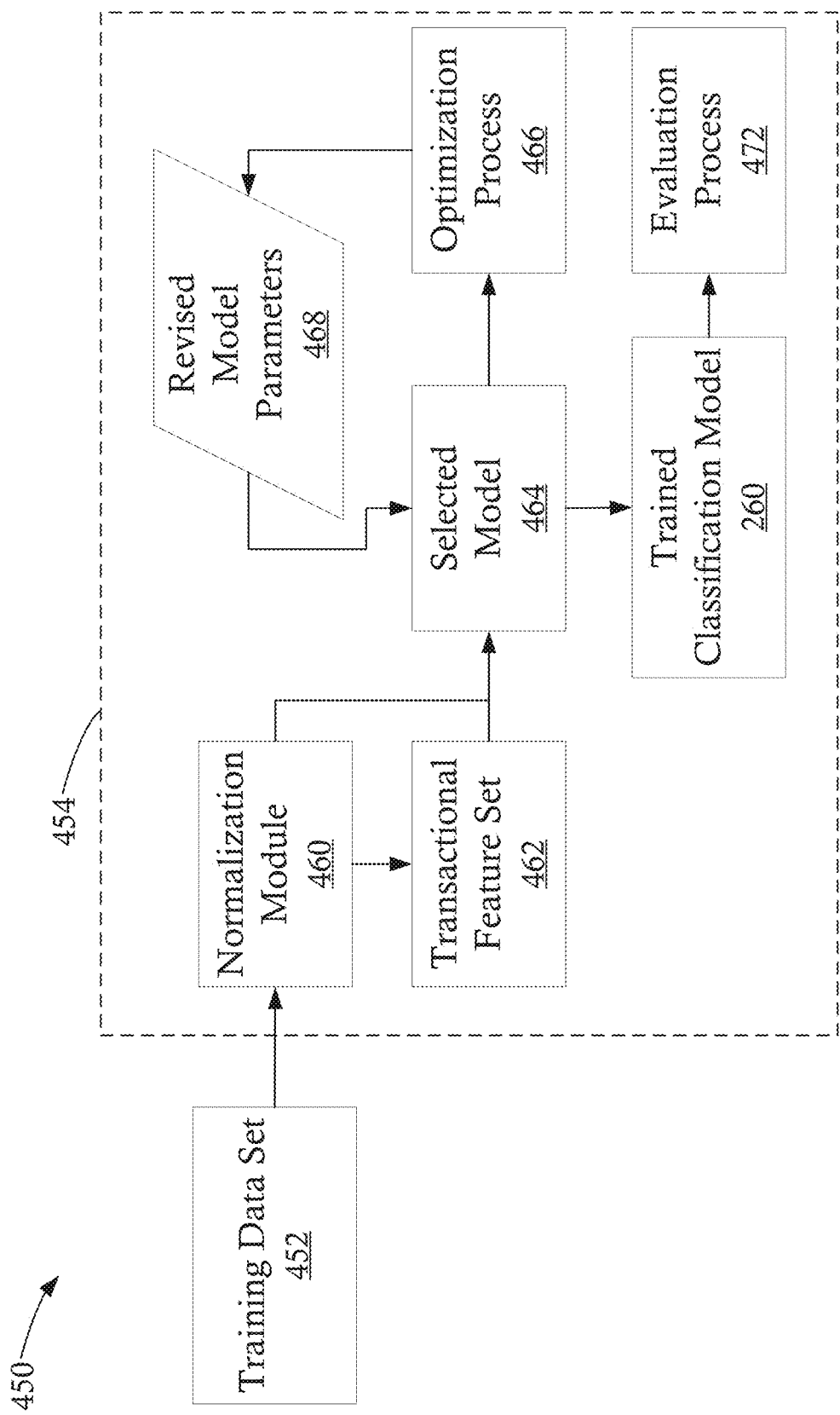
FIG. 10 is a process flow illustrating various steps of the generating a trained classification model, in accordance with some embodiments.

FIG. 9 is a flowchart illustrating a method 400 of generating a trained classification model, in accordance with some embodiments. FIG. 10 is a process flow 450 illustrating various steps of the method of generating a trained classification model, in accordance with some embodiments. At step 402, a training dataset 452 is received by model training engine 454. The training dataset 452 can include labeled and/or unlabeled data. For example, in some embodiments, a trained classification model is generated using unlabeled data.

In some embodiments, the training dataset 452 can include RFM data configured to train an RFM classification model. RFM data can include recency data, frequency data, and/or monitored value data for one or more users. In some embodiments, the training dataset 452 includes unlabeled sets of RFM data associated with a plurality of user identifiers and/or user profiles.

In some embodiments, the training dataset 452 includes a large dataset incorporating a variety of data points for a plurality of interactions associated with user identifiers. For example, the training dataset 452 can include purchase transaction data for purchase interactions associated with a user performed through multiple channels, such as e-commerce purchases, brick-and-mortar purchases, and/or any other suitable purchases. The transaction data can include features related to one or more transactions and/or one or more items included in a transaction.

At optional step 404, the received training dataset 452 is processed and/or normalized by a normalization module 460. For example, in some embodiments, the training dataset 452 can be augmented by imputing or estimating missing values of one or more features associated with a sequential state change. In some embodiments, processing of the received training dataset 452 includes outlier detection configured to remove data likely to skew training of a state prediction model. In some embodiments, processing of the received training dataset 452 includes removing features that have limited value with respect to training of the state prediction model.

At optional step 406, transactional feature sets 462 are extracted from the training dataset 452. The transactional feature sets 462 identify sets of features related to discrete transactions that are included for each user identifier within the training dataset 452. In some embodiments, the training dataset 452 includes only transactional features and step 406 can be skipped.

At step 408, an iterative training process is executed to train a selected model 464. For example, a model training engine 454 can be configured to obtain a selected model 464 including an untrained (e.g., base) machine learning model, such as a RFM framework, and/or a partially or previously trained model (e.g., a prior version of a trained classification model, a partially trained model from a prior iteration of a training process, etc.), from a model store, such as a model store database 30. The model training engine 454 is configured to iteratively adjust parameters (e.g., hyperparameters) of the selected model 464 to minimize a cost value (e.g., an output of a cost function) for the selected model 464. In some embodiments, the cost value is related to the likelihood of classification of a user within one of a set of potential classifications.

In some embodiments, the model training engine 454 implements an iterative training process that generates a set of revised model parameters 468 during each iteration. The set of revised model parameters 468 can be generated by applying an optimization process 466 to the cost function of the selected model 464. The optimization process 466 can be configured to reduce the cost value (e.g., reduce the output of the cost function) at each step by adjusting one or more parameters during each iteration of the training process.

After each iteration of the training process, at step 410, the model training engine 454 determines whether the training process is complete. The determination at step 410 can be based on any suitable parameters. For example, in some embodiments, a training process can complete after a predetermined number of iterations. As another example, in some embodiments, a training process can complete when it is determined that the cost function of the selected model 364 has reached a minimum, such as a local minimum and/or a global minimum.

At step 412, a trained classification model 262 is output and provided for use in a communication generation method, such as the method 200 discussed above with respect to FIGS. 5-6. The trained classification model 262 can include any suitable trained classification model, such as a trained RFM classification model. At optional step 414, a trained classification model 262 can be evaluated by an evaluation process 472 to determine the success rate of a classification generated by the trained classification model 262. The trained classification model 262 can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained classification model 262.

Figure 11:
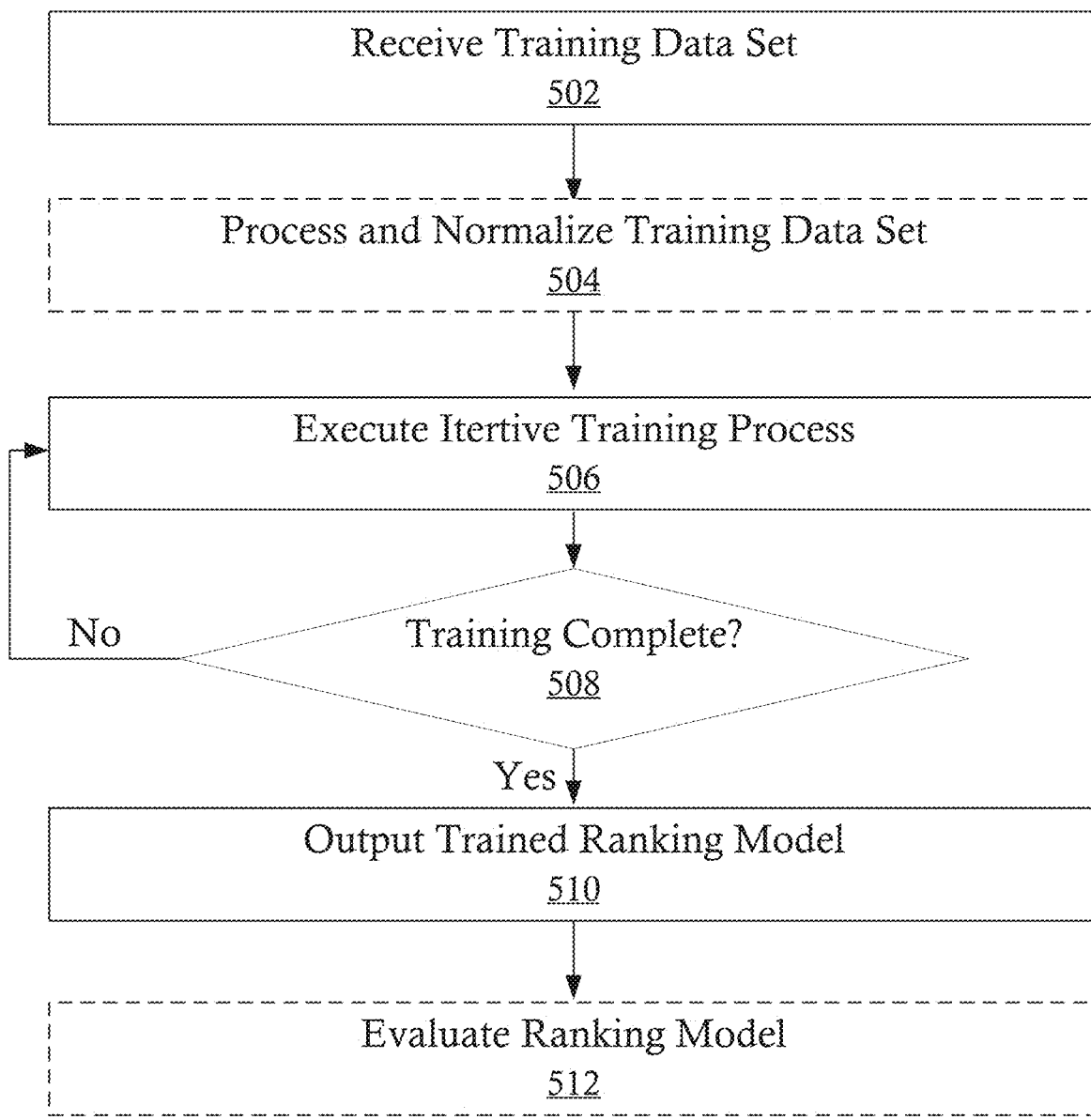
FIG. 11 is a flowchart illustrating a method of generating a trained ranking model, in accordance with some embodiments.
Figure 12:
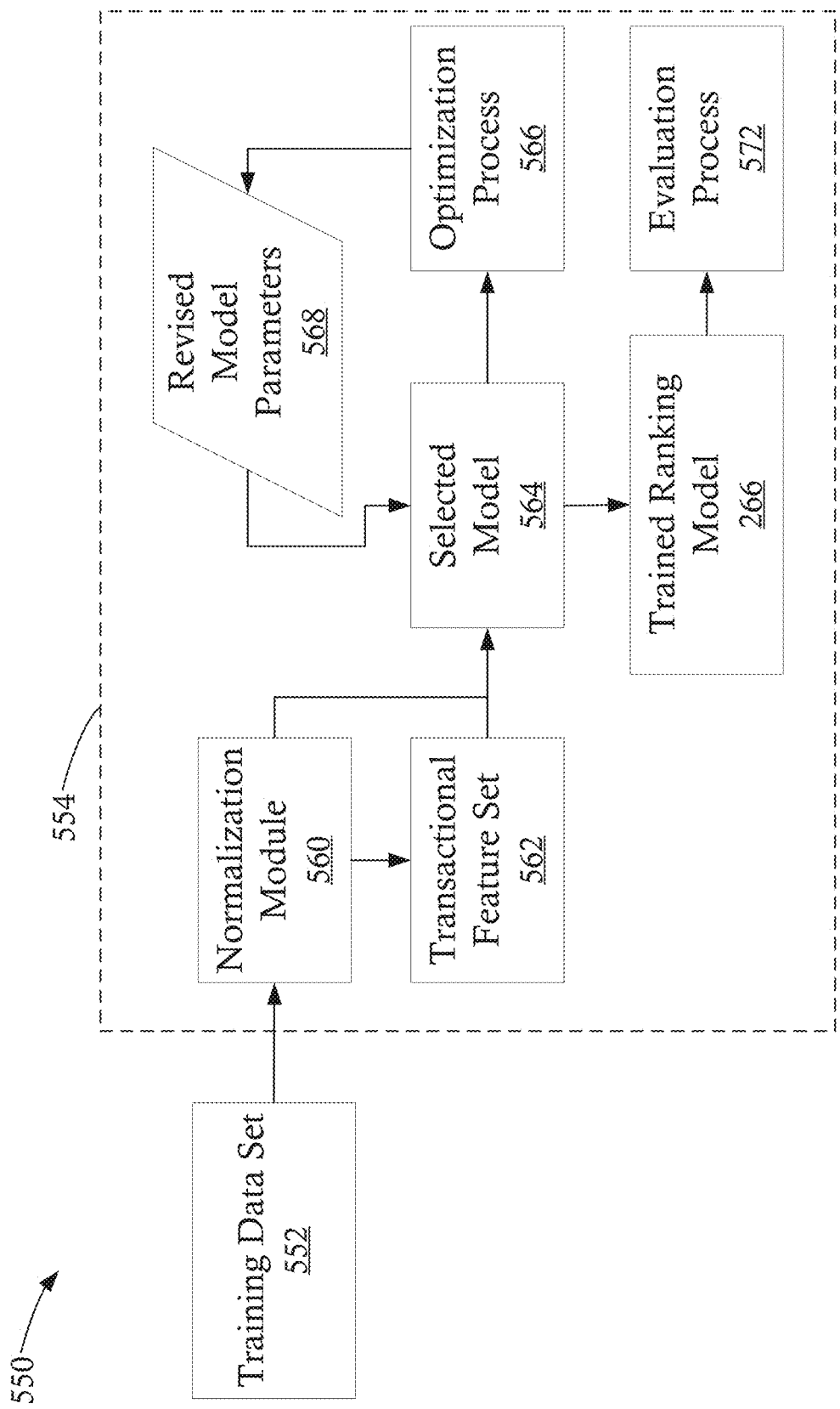
FIG. 12 is a process flow illustrating various steps of the method of generating a trained ranking model, in accordance with some embodiments.

FIG. 11 is a flowchart illustrating a method 500 of generating a trained ranking model, in accordance with some embodiments. FIG. 12 is a process flow 550 illustrating various steps of the method of generating a trained ranking model, in accordance with some embodiments. A step 502, a training dataset 552 is received by model training engine 554. The training dataset 552 can include labeled and/or unlabeled data. For example, in some embodiments, a trained ranking model is generated using at least partially labeled data.

In some embodiments, the training dataset 552 can include features representative of a category classification generated by a classification model, such as a trained classification model 262. The category classifications can identify a categorical classification for each user identifier included in the training dataset 552. In some embodiments, the training dataset 552 includes lists of ranked communication elements associated with user identifiers and/or actual interaction data for communications or communication elements provided as part of prior generated electronic communications.

In some embodiments, the training dataset 552 includes a large dataset incorporating a variety of data points for a plurality of interactions associated with user identifiers. For example, the training dataset 552 can include purchase transaction data for purchase interactions associated with a user performed through multiple channels, such as e-commerce purchases, brick-and-mortar purchases, and/or any other suitable purchases. The transaction data can include features related to one or more transactions and/or one or more items included in a transaction.

At optional step 504, the received training dataset 552 is processed and/or normalized by a normalization module 560. For example, in some embodiments, the training dataset 552 can be augmented by imputing or estimating missing values of one or more features associated with a sequential state change. In some embodiments, processing of the received training dataset 552 includes outlier detection configured to remove data likely to skew training of a state prediction model. In some embodiments, processing of the received training dataset 552 includes removing features that have limited value with respect to training of the state prediction model.

At step 506, an iterative training process is executed to train a selected model 564. For example, a model training engine 554 can be configured to obtain a selected model 564 including an untrained (e.g., base) machine learning model, such as a linear ranking framework, and/or a partially or previously trained model (e.g., a prior version of a trained classification model, a partially trained model from a prior iteration of a training process, etc.), from a model store, such as a model store database 30. The model training engine 554 is configured to iteratively adjust parameters (e.g., hyperparameters) of the selected model 464 to minimize a cost value (e.g., an output of a cost function) for the selected model 464. In some embodiments, the cost value is related to the likelihood of classification of a user within one of a set of potential classifications.

In some embodiments, the model training engine 554 implements an iterative training process that generates a set of revised model parameters 568 during each iteration. The set of revised model parameters 568 can be generated by applying an optimization process 566 to the cost function of the selected model 564. The optimization process 566 can be configured to reduce the cost value (e.g., reduce the output of the cost function) at each step by adjusting one or more parameters during each iteration of the training process.

After each iteration of the training process, at step 508, the model training engine 554 determines whether the training process is complete. The determination at step 508 can be based on any suitable parameters. For example, in some embodiments, a training process can complete after a predetermined number of iterations. As another example, in some embodiments, a training process can complete when it is determined that the cost function of the selected model 564 has reached a minimum, such as a local minimum and/or a global minimum.

At step 510, a trained ranking model 266 is output and provided for use in a communication generation method, such as the method 200 discussed above with respect to FIGS. 5-6. The trained ranking model 266 can include any suitable trained ranking model, such as a trained linear ranking model. At optional step 512, a trained ranking model 266 can be evaluated by an evaluation process 572 to determine the accuracy of the rankings generated by the trained ranking model 266. The trained ranking model 266 can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained ranking model 266.

Figure 13:
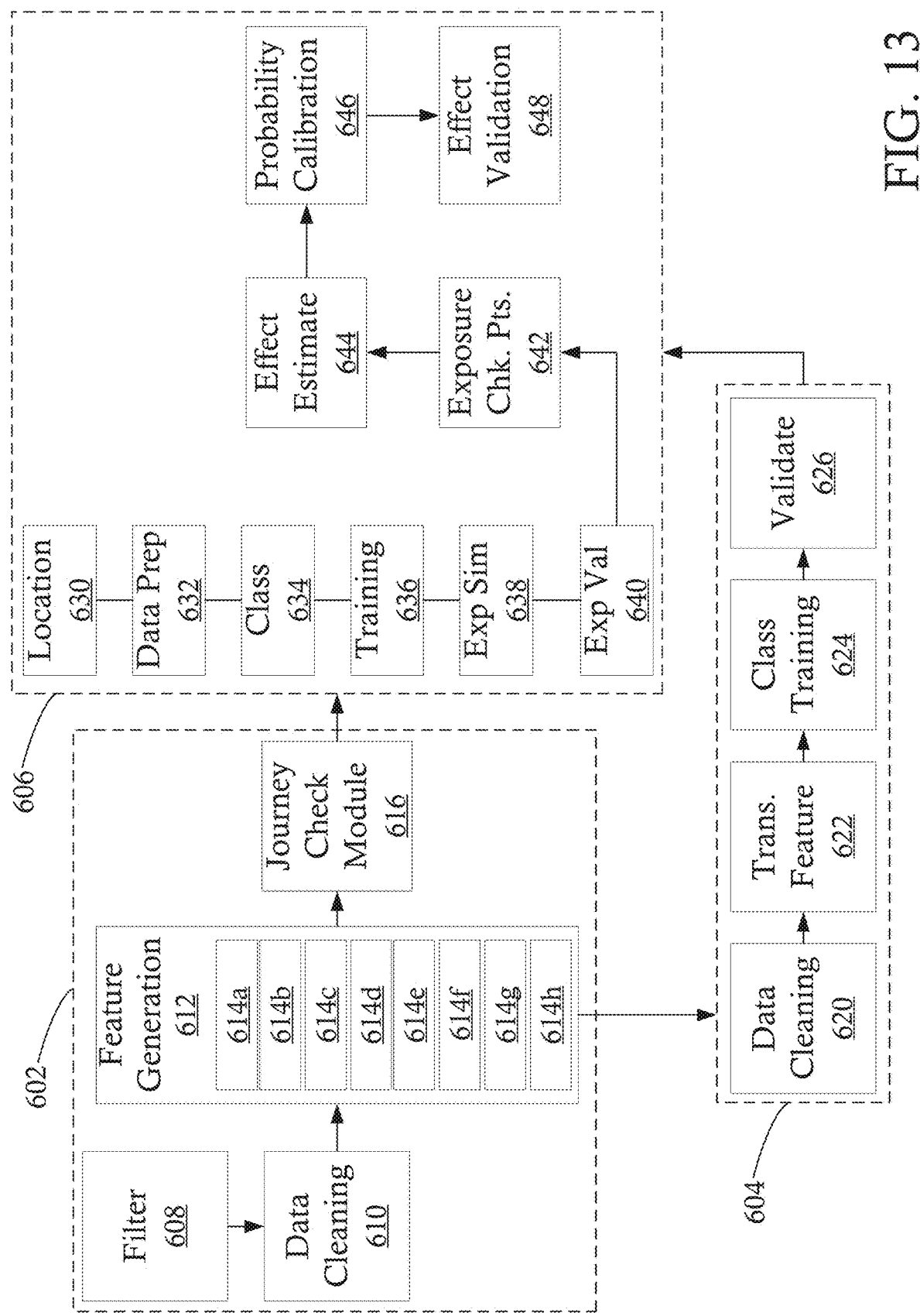
FIG. 13 illustrates an affinity model architecture, in accordance with some embodiments.

FIG. 13 illustrates an affinity model architecture 600, in accordance with some embodiments. The affinity model architecture 600 is configured to identify user communication element affinities, e.g., recommendations, for inclusion in generated electronic communications, as discussed above. The affinity model architecture 600 includes a user journey pipeline 602, a classification model generation pipeline 604, and a communication affinity pipeline 606. Although specific embodiments are discussed herein, it will be appreciated that additional and/or alternative pipelines can be included in the affinity model architecture 600.

In some embodiments, the user journey pipeline 602 is configured to receive user data, such as concurrent session data and/or historical user data, and extract user features, user flags, and/or other relevant user data for use by the classification model generation pipeline 604 and/or the communication affinity pipeline 606. The user journey pipeline 602 includes a filter 608 configured to restrict the pipeline to only data related to users meeting some predetermined criteria. For example, in some embodiments, the filter 608 is configured to exclude user data related to users having less than a certain number of interactions (e.g., transactions) within a given time period, such as less than 3 transactions within the last year.

A data cleaning module 610 is configured to clean input data. For example, in various embodiments, the data cleaning module 610 is configured to perform outlier removal and/or anomaly analysis to identify anomalous data and remove identified data from the data set. A feature generation module 612 is configured to extract and/or generate various features from the input data set. The feature generation module 612 is configured to generate relevant input features for use by the classification model generation pipeline 604 and/or the communication affinity pipeline 606. The set of generated features can include any suitable features, such as, for example, program membership features 614a (e.g., features indicative of a user's membership in an enrollment program), transactional features 614b (e.g., features indicative of historical and/or concurrent transactions), third party features 614c, interaction features 614d (e.g., features indicative of historical and/or concurrent interactions), intent features 614e, interaction behavior features 614f, benefit features 614g, engagement features 614h, and/or any other suitable features.

In some embodiments, a first portion of the features 614a-614h extracted by the feature generation module 612 is provided to the classification model generation pipeline 604 and a second portion of the features 614a-614h is provided to the communication affinity pipeline 606. In some embodiments, prior to providing features 614a-614h to the communication affinity pipeline 606, a journey check model 616 determines, based on one or more extracted features 614a-614h, if a user is eligible for inclusion in a communication campaign. For example, in some embodiments, a user flag can be set (e.g., have a value of 1) when a user is eligible for receiving a communication related to an enrollment program and can be unset (e.g., have a value of 0) when a user is not eligible to receive a communication.

The classification model generation pipeline 604 receives a subset of the features 614a-614h extracted from the user data and implements a classification-specific data cleaning module 620. The cleaned data is provided to a transactional feature extraction module 622 configured to isolate, extract, and/or generate features for classification. For example, in embodiments including an RFM model, the transactional feature extraction module 622 is configured to extract features related to recency, frequency, and/or monitored value determinations. A trained classification model is generated by a training module 624, for example as discussed above with respect to FIGS. 9 and 10. The trained classification model can include, but is not limited to, an RFM classification model. The classifications generated by the trained model are validated by a segment validation module 626. After validation, the classifications (e.g., classification categories and/or individual user profile classifications) are provided to the communication affinity pipeline 606.

The communication affinity pipeline 606 is configured to receive inputs from both the user journey pipeline 602 and the classification model generation pipeline 604. In some embodiments, the input from the user journey pipeline 602 includes an intervention eligibility flag configured to identify whether a particular user is eligible for a communication campaign, e.g., an intervention, related to an enrollment program. The communication affinity pipeline 606 is further configured to receive a classification from the classification model generation pipeline 604 and/or one or more additional features from the user journey pipeline 602.

In some embodiments, a related retail location is selected by a location module 630 configured to identify a most-relevant brick-and-mortar location for fulfillment of various program benefits that can be associated with communication elements. A feature preparation module 632 prepares the received data features for use in subsequent processes and a classification module 634 is configured to classify each set of input data, e.g., each set of data associated with an user identifier and/or user profile, into one of a set of predetermined classifications. For example, in some embodiments, the classification module 634 is configured to implement at trained classification model generated by the classification model generation pipeline 604.

A training module 636 is configured to train one or more ranking models, for example, as discussed in greater detail above with respect to FIGS. 11 and 12. The trained ranking models can include, but are not limited to, linear ranking models, logistical regression-trained ranking models, and/or any other suitable ranking models. After training, in some embodiments, an exposure simulation module 638 is configured to simulate user interactions with a first round of communications and an exposure validation module 640 is configured to validate the output of the trained ranking model.

In some embodiments, an exposure check point module 642 validates checkpoints identified for certain communications and an effect estimation module 644 estimates an impact of certain communications over various communication channels for simulated users and/or segments of users. If required, a probability calibration module 646 adjusts the trained ranking model to modify the probability of various communication element interactions and the a validation module 648 validates the generated models, including, for example, validating the checkpoints and the simulated effects.

Although the subject matter has been described in terms of exemplary embodiments, it is not limited thereto. Rather, the appended claims should be construed broadly, to include other variants and embodiments, which can be made by those skilled in the art.

What is claimed is:
1. A system, comprising:
a non-transitory memory;
a processor communicatively coupled to the non-transitory memory, wherein the processor is configured to read a set of instructions to:
receive a user identifier;
generate a user profile for the user identifier, wherein the user profile includes a plurality of user features;
an affinity module configured to:
classify the user profile into one of a plurality of classifications using a trained classification model, wherein the trained classification model is configured to receive a first subset of the plurality of user features, and wherein a classification of the user profile represents a categorization of data related to the user profile;
select, based on the classification of the user profile, a communication channel of one or more communication channels available at an electronic device;
generate a ranked set of communication elements using a trained ranking model, wherein the trained ranking model is configured to receive a second subset of the plurality of user features and a set of communication elements and generate the ranked set of communication elements based on a probability of interaction between each communication element in the set of communication elements based on the second subset of the plurality of user features; and
the processor further configured to read a set of instructions to:
in response to the classification of the user profile and generation of the ranked set of communication elements, generate an electronic communication including a plurality of interface elements for a selected communication channel, wherein:
the plurality of interface elements includes at least one communication element selected from the ranked set of communication elements in descending ranked order, and
a type of the electronic communication is selected based on the classification of the user profile.

2. The system of claim 1, wherein the trained classification model comprises a recency, frequency, and monitored value (RFM) model.

3. The system of claim 1, wherein the trained ranking model comprises a linear ranking model.

4. The system of claim 1, wherein the trained ranking model is configured to receive the classification of the user profile as an input.

5. The system of claim 1, wherein the processor is configured to read the set of instructions to update the user profile to include at least one default feature based on the classification of the user profile, wherein the user profile is updated prior to generating the ranked set of communication elements.

6. The system of claim 1, wherein the processor is configured to read the set of instructions to:
receive concurrent interaction data related to the user identifier;
generate an updated classification model; and
generate a second electronic communication including at least one ranked communication element selected from the ranked set of communication elements in descending ranked order, and wherein a type of the second electronic communication is selected based on a classification of the user profile by the updated classification model.

7. The system of claim 1, wherein the processor is configured to read the set of instructions to:
receive concurrent interaction data related to the user identifier;
generate an updated ranking model; and
generate a second electronic communication including at least one communication element selected from a second ranked set of communication elements generated by the updated ranking model.

8. The system of claim 1, wherein the plurality of user features includes transactional features, third-party features, enrollment program features, and intent features.

9. A computer-implemented method, comprising
receiving, by a processor, a user identifier;
generating, by the processor, a user profile for the user identifier, wherein the user profile includes a plurality of user features;
classifying, by a trained classification model, the user profile into one of a plurality of classifications, wherein the trained classification model is configured to receive a first subset of the plurality of user features, and wherein a classification of the user profile represents a categorization of data related to the user profile;
selecting, based on the classification of the user profile, a communication channel of the one or more communication channels available at an electronic device;
generating, by a trained ranking model, a ranked set of communication elements, wherein the trained ranking model is configured to receive a second subset of the plurality of user features and a set of communication elements and generate the ranked set of communication elements based on a probability of interaction between each communication element in the set of communication elements based on the second subset of the plurality of user features; and
in response to the classification of the user profile and generation of the ranked set of communication elements, generating, by the processor, an electronic communication including a plurality of interface elements for a selected communication channel, wherein:
the plurality of interface elements includes at least one communication element selected from the ranked set of communication elements in descending ranked order, and
a type of the electronic communication is selected based on the classification of the user profile.

10. The method of claim 9, wherein the trained classification model comprises a recency, frequency, and monitored value (RFM) model.

11. The method of claim 9, wherein the trained ranking model comprises a linear ranking model.

12. The method of claim 9, wherein the trained ranking model is configured to receive the classification of the user profile as an input.

13. The method of claim 9, comprising updating, by the processor, the user profile to include at least one default feature based on the classification of the user profile.

14. The method of claim 9, comprising:
receiving, by the processor, concurrent interaction data related to the user identifier;
generating, by the processor, an updated classification model; and
generating, by the processor, a second electronic communication including at least one communication element selected from the ranked set of communication elements in descending ranked order, and wherein a type of the second electronic communication is selected based on a classification of the user profile by the updated classification model.

15. The method of claim 9, comprising:
receiving, by the processor, concurrent interaction data related to the user identifier;
generating, by the processor, an updated ranking model; and
generating, by the processor, a second electronic communication including at least one communication element selected from a second ranked set of communication elements in descending ranked order, wherein the second ranked set of communication elements is generated by the updated ranking model.

16. The method of claim 9, wherein the plurality of user features includes transactional features, third-party features, enrollment program features, and intent features.

17. A non-transitory computer-readable medium having instructions stored thereon, wherein the instructions, when executed by at least one processor, cause a device to perform operations comprising:
  receiving, by a processor, a user identifier;
  generating, by the processor, a user profile for the user identifier, wherein the user profile includes a plurality of user features;
  classifying, by a trained classification model, the user profile into one of a plurality of classifications, wherein the trained classification model is configured to receive a first subset of the plurality of user features, and wherein a classification of the user profile represents a categorization of data related to the user profile;
  selecting, based on the classification of the user profile, a communication channel of the one or more communication channels available at an electronic device;
  ranking, by a trained ranking model, a set of communication elements, wherein the trained ranking model is configured to receive a second subset of the plurality of user features and a set of communication elements and generate the ranked set of communication elements based on a probability of interaction between each communication element in the set of communication elements based on the second subset of the plurality of user features; and
  in response to the classification of the user profile and generation of the ranked set of communication elements, generating, by the processor, an electronic communication including a plurality of interface elements for a selected communication channel, wherein:
    the plurality of interface elements includes at least one communication element selected from the ranked set of communication elements in descending ranked order, and
    a type of the electronic communication is selected based on the classification of the user profile.

18. The non-transitory computer-readable medium of claim 17, wherein the trained classification model comprises a recency, frequency, and monitored value (RFM) model.

19. The non-transitory computer-readable medium of claim 17, wherein the trained ranking model comprises a linear ranking model.

20. The non-transitory computer-readable medium of claim 17, wherein the trained ranking model is configured to receive the classification of the user profile as an input.

* * * * *